US011110965B2

(12) United States Patent
Yashiro et al.

(10) Patent No.: US 11,110,965 B2
(45) Date of Patent: Sep. 7, 2021

(54) VEHICLE BODY FRONT STRUCTURE

(71) Applicant: SUZUKI MOTOR CORPORATION, Hamamatsu (JP)

(72) Inventors: Hironao Yashiro, Hamamatsu (JP); Tatsuya Manabe, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 100 days.

(21) Appl. No.: 16/660,264

(22) Filed: Oct. 22, 2019

(65) Prior Publication Data

US 2020/0148275 A1    May 14, 2020

(30) Foreign Application Priority Data

Nov. 8, 2018  (JP) .............................. JP2018-210368

(51) Int. Cl.
*B62D 25/08*  (2006.01)
*B62D 21/15*  (2006.01)

(52) U.S. Cl.
CPC ......... *B62D 25/081* (2013.01); *B62D 21/152* (2013.01)

(58) Field of Classification Search
CPC ............................ B62D 25/081; B62D 21/152
See application file for complete search history.

(56) References Cited

U.S. PATENT DOCUMENTS

| | | | |
|---|---|---|---|
| 9,242,675 B2 * | 1/2016 | Kuriyama | B62D 21/152 |
| 9,381,952 B2 * | 7/2016 | Furusaki | B62D 25/16 |
| 9,650,075 B2 * | 5/2017 | Murayama | B62D 25/082 |
| 9,676,417 B2 * | 6/2017 | Yamada | B60R 19/12 |
| 9,914,484 B2 | 3/2018 | Kawabe et al. | |
| 2016/0046250 A1 * | 2/2016 | Sotoyama | B62D 21/152 293/155 |

FOREIGN PATENT DOCUMENTS

JP    2017-77746 A    4/2017

OTHER PUBLICATIONS

German Office Action dated Sep. 18, 2020, issued by the German Patent Office in corresponding application 10 2019 129 946.2.

* cited by examiner

*Primary Examiner* — Lori L Lyjak
(74) *Attorney, Agent, or Firm* — Stein IP, LLC

(57) ABSTRACT

A vehicle body front structure is provided that can control an amount of absorption of collision load for each portion of a cowl side member while deforming the cowl side member more reliably. A configuration of a vehicle body front structure according to the present invention includes a front side member that is located on a side of a power unit mounting room and that extends in a front-rear direction, a side body constituting a vehicle body side face in the rear of the power unit mounting room, a cowl side member that is spaced apart from and disposed on the vehicle-width direction outer side of the front side member, and that extends from the side body toward the front of the vehicle, and the cowl side member includes a rear portion that extends from the side body toward the front of the vehicle in parallel with the front side member, and a front portion that bends at a front end of the rear portion and extends downward toward the front of the vehicle, and an upper face of the front portion is flat, the front end of the front portion is located above the front side member and is tapered toward the front of the vehicle.

5 Claims, 4 Drawing Sheets

VEHICLE BODY FRONT STRUCTURE

CROSS-REFERENCE TO RELATED APPLICATION

This application is based upon and claims the benefit of priority from the prior Japanese Patent Application No. 2018-210368, filed on Nov. 8, 2018, the entire contents of which are incorporated herein by reference.

FIELD

The present invention relates to a vehicle body front structure.

BACKGROUND

Japanese Patent laid-open publication No. 2017-77746 discloses a vehicle body front structure including a front side frame extending in a vehicle body front-rear direction and a side member extending from a front pillar toward the front of the vehicle body, for example. In Japanese Patent laid-open publication No. 2017-77746, a front end of the side member is connected with a front end of the front side frame by a connecting member.

In Japanese Patent laid-open publication No. 2017-77746, a first bending portion and a second bending portion are provided on the side member, and a fragile portion is provided between the first bending portion and the second bending portion. According to Japanese Patent laid-open publication No. 2017-77746, such a configuration makes it possible to deform the side member so as to bend approximately into a Z shape at the time of a collision, and to absorb the collision load by the side member.

However, assuming that the side member is deformed first at the fragile portion when the collision load is input, it is difficult to say that a positional relationship between the first and second bending portions and the fragile portion has been considered in detail in Japanese Patent laid-open publication No. 2017-77746. In other words, with the technique of Japanese Patent laid-open publication No. 2017-77746, there is a risk that a deformation at the first bending portion and the second bending portion of the side member will not occur as assumed and the collision load will not be sufficiently absorbed. In addition, since it is expected that the amount of absorption of collision load is controlled for each portion of the side member due to the side member deforming as assumed, there is room for improvement in the shape of the side member itself in Japanese Patent laid-open publication No. 2017-77746.

In view of the foregoing problems, an object of the present invention is to provide a vehicle body front structure that can control the amount of absorption of collision load for each portion of a cowl side member while more reliably deforming the cowl side member as assumed.

SUMMARY OF THE DISCLOSURE

In order to solve the foregoing problems, a representative configuration of a vehicle body front structure according to the present invention is a vehicle body front structure including a front side member that is located on a side of a power unit mounting room located in a front portion of a vehicle and that extends in a front-rear direction, a side body constituting a vehicle body side face in the rear of the power unit mounting room; a cowl side member that is spaced apart from and disposed on the vehicle-width direction outer side of the front side member, and that extends from the side body toward the front of the vehicle, and the cowl side member includes: a rear portion that extends from the side body toward the front of the vehicle in parallel to the front side member, and a front portion that bends at a front end of the rear portion and extends downward toward the front of the vehicle, and a top face of the front portion is flat, a front end of the front portion is located above the front side member and is tapered toward the front of the vehicle.

According to the present invention, a vehicle body front structure can be provided that can control an amount of absorption of collision load for each portion of a cowl side member while more reliably deforming the cowl side member as assumed.

DETAILED DESCRIPTION

Figure 1:
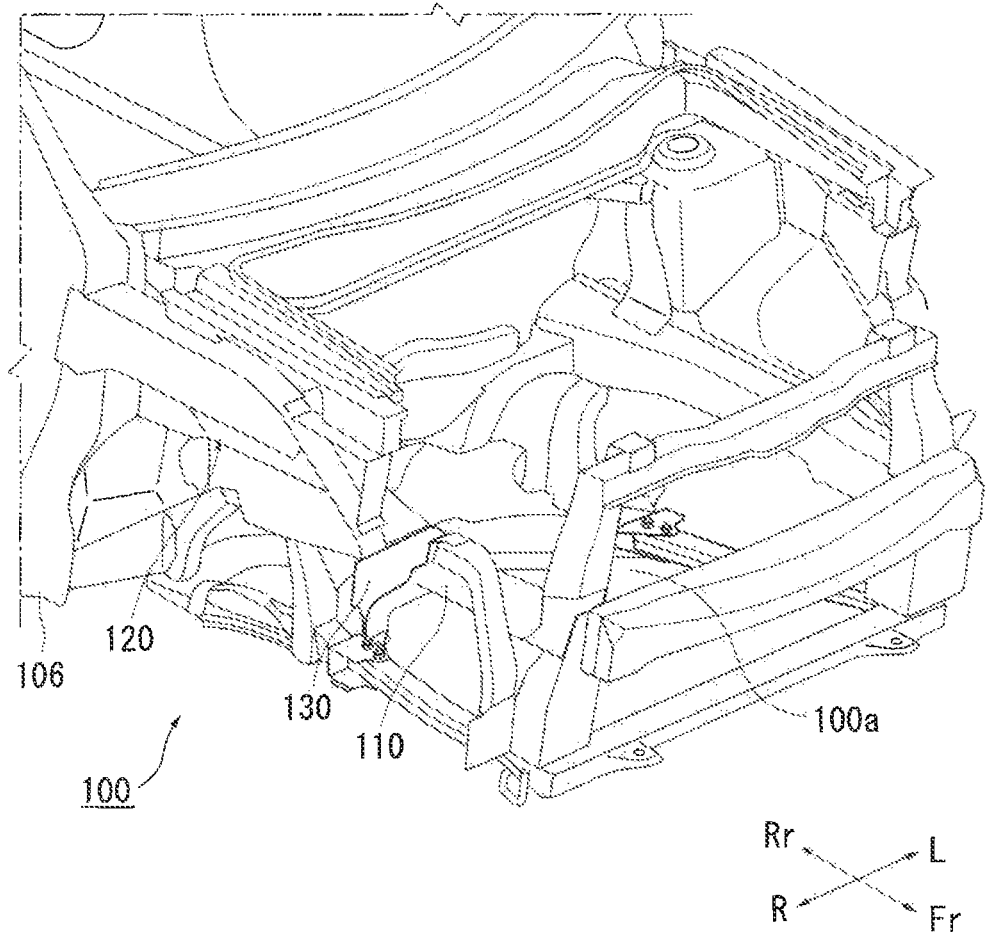
FIG. 1 is a general perspective view of a vehicle body front structure according to the present embodiment.

A vehicle body front structure according to an aspect of the present invention is a vehicle body front structure including a front-side member that is located on a side of a power unit mounting room located in a front portion of a vehicle and that extends in a front-rear direction, a side body constituting a vehicle body side face in the rear of the power unit mounting room; a cowl side member that is spaced apart from and disposed on the vehicle-width direction outer side of the front-side member, and that extends from the side body toward the front of the vehicle, and the cowl side member includes: a rear portion that extends from the side body toward the front of the vehicle in parallel to the front-side member, and a front portion that bends at a front end of the rear portion and extends downward toward the front of the vehicle, and an upper face of the front portion is flat, a front end of the front portion is located above the front side member and is tapered toward the front of the vehicle.

According to the above-described configuration, the bending part forms a boundary between the front portion and the rear portion, and no fragile part that is assumed to be deformed, such as this bending portion, is formed in the region thereof. Accordingly, it is possible to more reliably bend, that is, to deform, the cowl side member at the boundary between the front portion and the rear portion. As such, it is possible to more reliably deform the cowl side member as assumed and to ensure the desired collision load absorption performance. Furthermore, the front portion of the cowl side member is tapered toward the front of the vehicle, and thus it is possible to control the amount of absorption of collision loads in the front-rear direction of the front portion.

In addition, due to an upper face of the front portion being flat, if the cowl side member bends at the boundary between the front portion and the rear portion, the upper face of the front portion forms a flat face that is vertical to the traveling direction. This makes it possible to absorb collision loads on the vertical surface. Furthermore, in the above-described configuration, the cowl side member and the front side member are distanced from each other in the vehicle-width direction. In other words, the cowl side member and the front side member are not directly joined with each other. Accordingly, it is possible to more reliably deform the front portion of the cowl side member downward, and to achieve the above-described effects.

The front end of the front portion of the above-described cowl side member may be a vertical surface. In this manner, the front end of the front portion is a vertical surface, and thus a collision object can be received over a wider area. Accordingly, it is possible to suppress a regional deformation of the collision object and to significantly reduce injuries. Furthermore, since the front end of the front portion is a surface, a greater collision load can be input. This promotes a bending at a portion between the front portion and the rear portion, making it possible to more reliably achieve the above-described effects.

The vehicle body front structure may further include a connection bracket for connecting the front end of the front portion of the cowl side member with the front side member in the vehicle-width direction, and the connection bracket may have a vertical surface that is wider than the above-mentioned vertical surface and that faces toward the front side of the vehicle. The connection bracket includes a vertical surface that is larger than the vertical surface on the front end of the front portion of the cowl side member, and thus the connection bracket can receive the collision object over a wider area. Accordingly, a regional deformation of the collision object can be more effectively suppressed.

Furthermore, the cowl side member and the front side member are connected with each other by the connection bracket, and thus it is possible to improve the rigidity of surrounding members attached to the cowl side member. Accordingly, the rigidity of the surrounding member can be improved.

A fragile structure that is more fragile than the surrounding portions may be formed on a side face of the boundary between the rear portion and the front portion of the above-described cowl side member. In this manner, the boundary between the front portion and the rear portion, that is, the bending part itself, can serve as the fragile part. Accordingly, it is possible to promote the deformation at the bending part and to more reliably achieve the above-described effects.

EMBODIMENT

Preferred embodiments of the present invention will be described below in detail with reference to the accompanying drawings. The dimensions, materials, and other specific numerical values described in these embodiments are merely examples for facilitating the understanding of the present invention, and are not to be construed as limiting the invention unless otherwise stated. It should be noted that elements constituting substantially identical functions and configurations are denoted by identical reference numerals in the present specification and the drawings, and hence redundant description has been omitted. Also, illustrations of elements that are not directly relevant to the present invention have been omitted.

Figure 2:
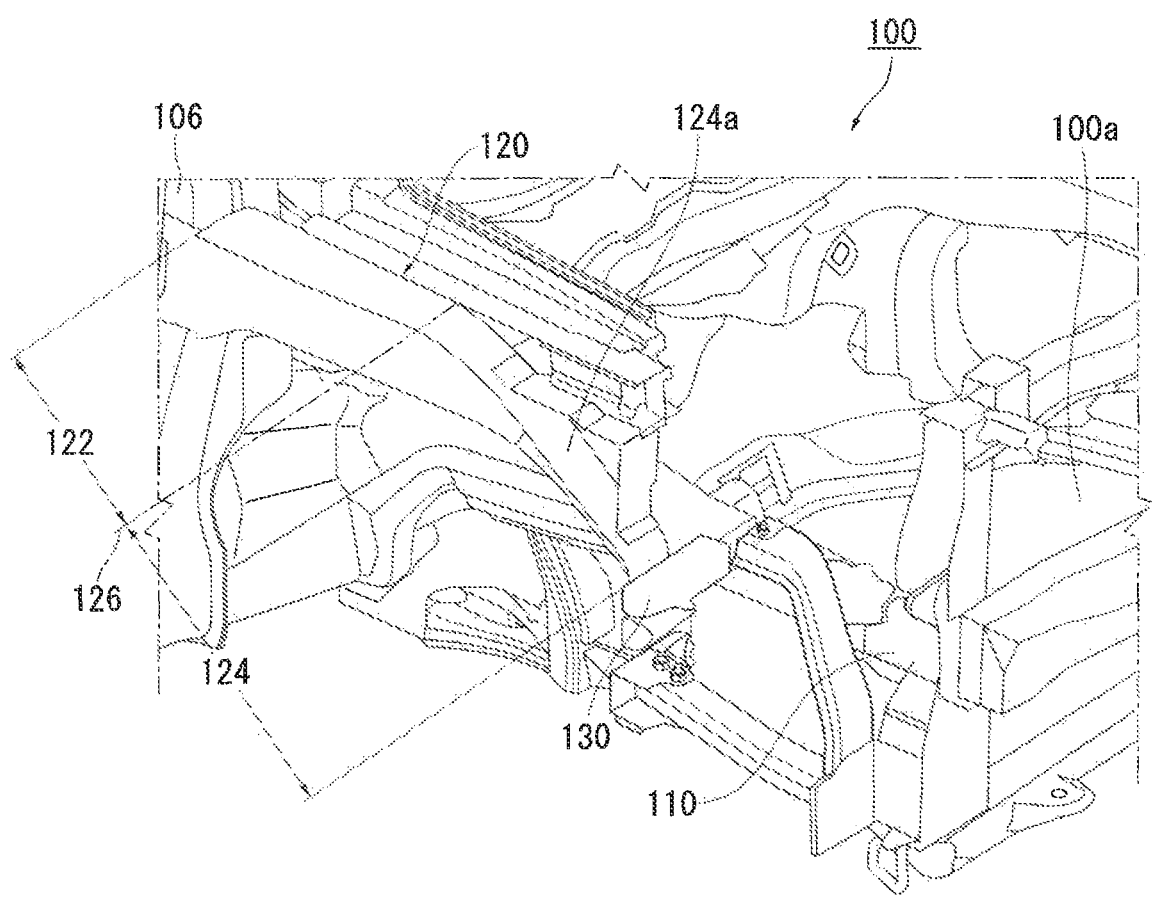
FIG. 2 is an enlarged view of the vehicle body front structure of FIG. 1.
Figure 2:
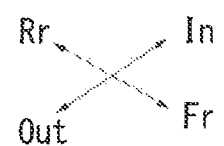

FIG. 1 is a general perspective view of a vehicle body front structure 100 according to the present embodiment. FIG. 2 is an enlarged view of the vehicle body front structure 100 in FIG. 1. Note, that in the present embodiment, although the side portion on the right side of the vehicle body (the entire vehicle body is not shown) will be illustrated, the present invention can be applied to the side portion on the left side as well. In the drawings used in the following descriptions, the above-described "front", "rear", "left", "right", "up" and "down" directions with respect to the passenger are denoted as "Fr", "Rr", "L", "R", "Up", and "Down" as necessary.

As shown in FIGS. 1 and 2, in the vehicle body front structure 100 of the present embodiment, the front side member 110 extending in the front-rear direction is disposed on the side of a power unit mounting room 100a located in the front portion of the vehicle.

Figure 3:
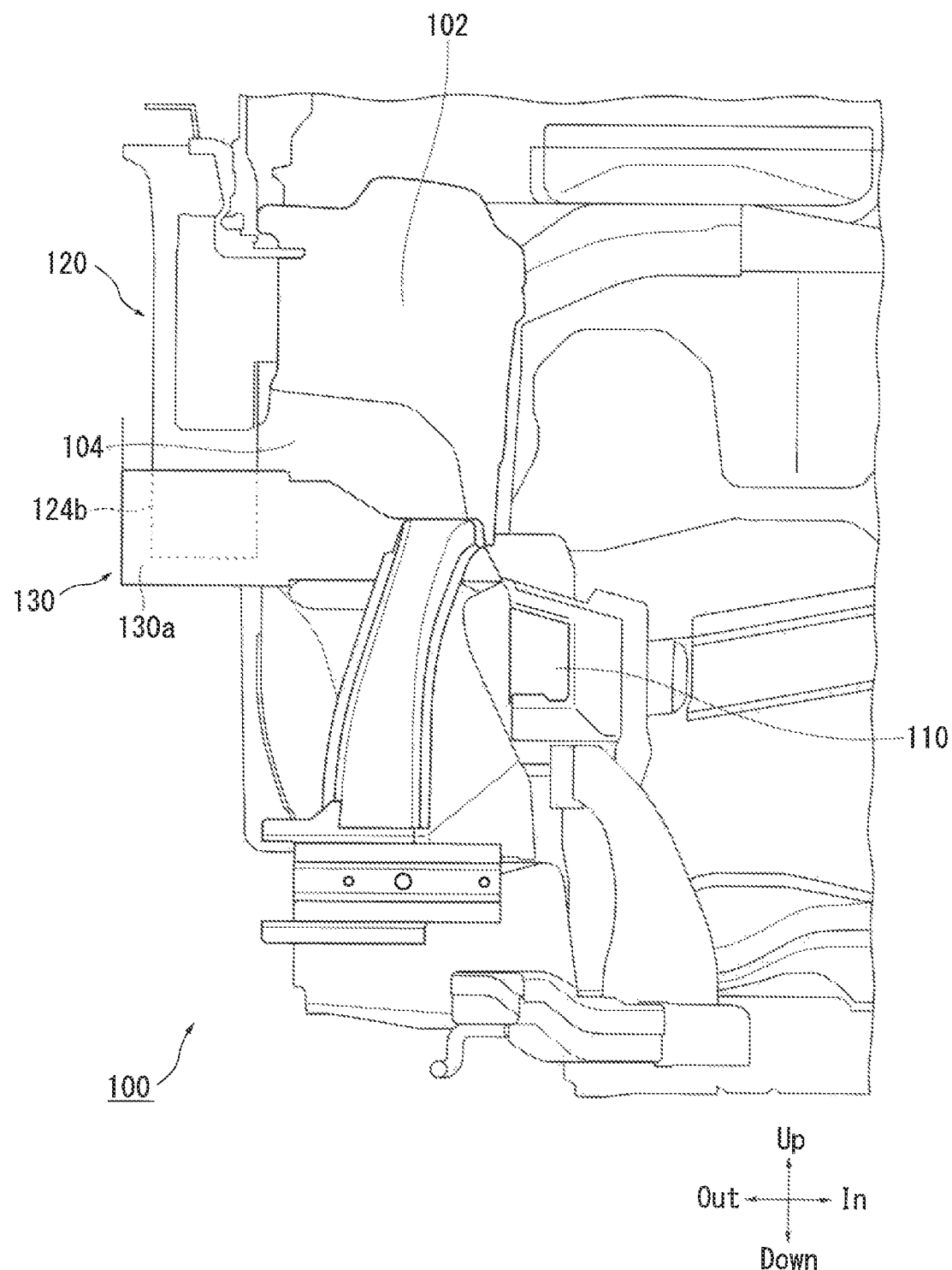
FIG. 3 is a diagram showing members in the rear of the front side member of FIG. 2 observed from the front.

FIG. 3 is a diagram showing members in the rear of a front side member 110 of FIG. 2 observed from the front. As shown in FIG. 3, a strut tower 102 to which the suspension (not shown) is fixed is disposed on the vehicle-width direction outer side of the front side member 110. A fender apron 104 is disposed at a portion that is in front of the strut tower 102 and on the vehicle-width direction outer side of the front side member 110.

Figure 4:
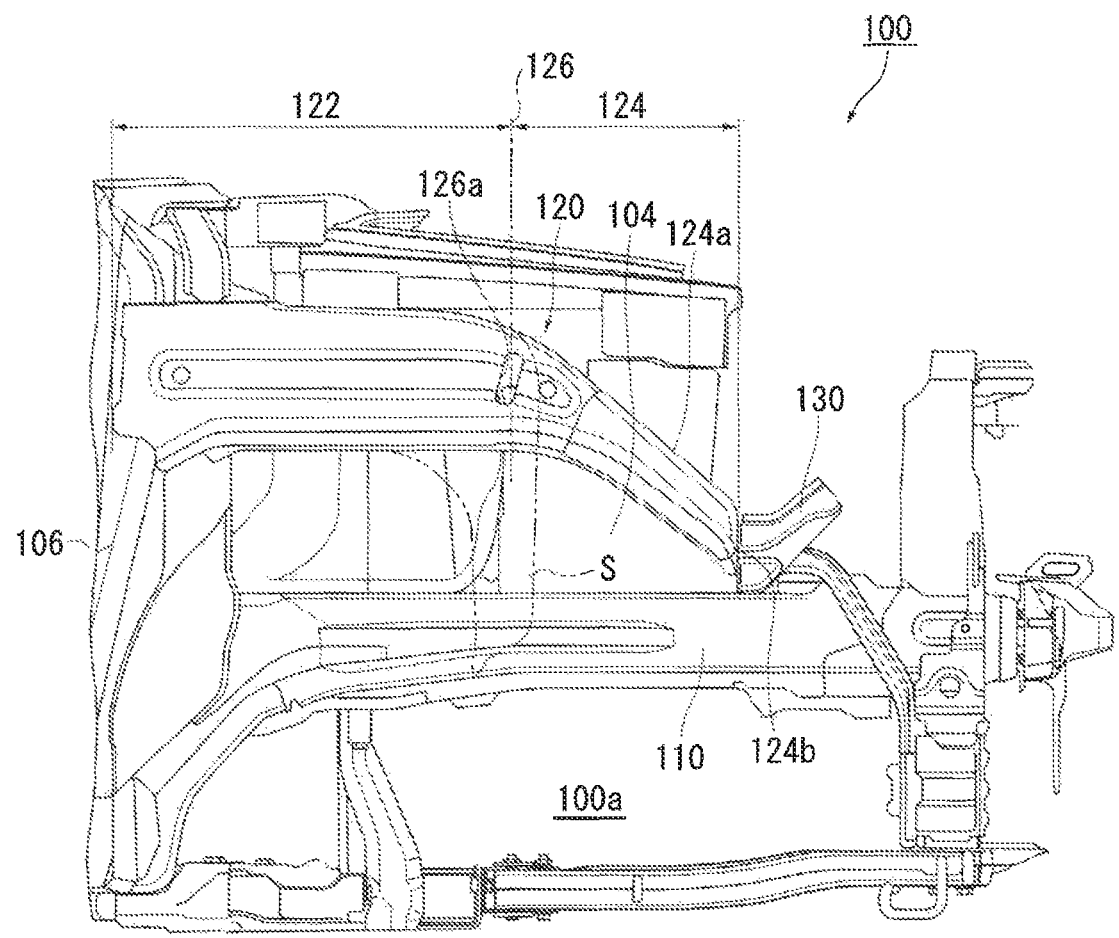
FIG. 4 is a diagram showing the vehicle body front structure of FIG. 1 observed from a side.
Figure 4:
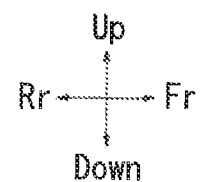

FIG. 4 is a diagram showing the vehicle body front structure 100 of FIG. 1 observed from the side. As shown in FIG. 4, a side body 106 that constitutes a vehicle body side face is disposed in the rear of the power unit mounting room 100a. A cowl side member 120 extending toward the front of the vehicle is disposed in front of the side body 106. As shown in FIG. 3, the cowl side member 120 is spaced apart from and disposed on the vehicle-width direction outer side of the front side member 110.

As shown in FIG. 4, the cowl side member 120 includes a rear portion 122 and a front portion 124. The rear portion 122 is a member extending from the side body 106 toward the front of the vehicle in parallel with the front side member 110. The front portion 124 is a member that bends at the front end of the rear portion 122 and that extends downward toward the front of the vehicle. A boundary between the front portion 124 and the rear portion 122 is called a bending portion 126.

In the vehicle body front structure 100 according to the present embodiment, as shown in FIG. 2, an upper face 124a of the front portion 124 of the cowl side member 120 is flat. As shown in FIG. 4, the front end 124b of the front portion 124 is located above the front side member 110. Due to the front portion 124 being tapered toward the front of the vehicle, the cross section of the front portion 124 is reduced toward the front of the vehicle.

As described above, in the vehicle body front structure 100 of the present embodiment, the bending portion 126 forms the boundary between the front portion 124 and the rear portion 122, and no fragile part that is assumed to be deformed, such as the bending portion 126, is formed in the region of the bending portion 126. In this manner, the cowl side member 120 can be more reliably deformed at the bending portion 126. Accordingly, it is possible to ensure the desired collision load absorption performance. Furthermore, the front portion 124 of the cowl side member 120 is tapered and its cross section is reduced toward the front of the vehicle, and thus it is possible to control the amount of absorption of collision load in the front-rear direction of the front portion 124.

Furthermore, due to the upper face 124a of the front portion 124 being flat as described above, as shown in FIG. 4, if the cowl side member 120 bends at the bending portion 126, the upper face 124a of the front portion 124 forms a surface S (shown by the two-dot chain line) that is vertical to the traveling direction. This makes it possible to absorb the collision load by this vertical surface.

Furthermore, as have been illustrated in FIG. 3, in the above-described configuration, the cowl side member 120 and the front side member 110 are distanced from each other in the vehicle-width direction, and the cowl side member 120 and the front side member 110 are not directly joined. This makes it possible to more reliably deform the front portion 124 of the cowl side member 120 downward, and to achieve the above-described effects.

Furthermore, in the vehicle body front structure 100 of the present embodiment, the front end 124b of the front portion 124 of the cowl side member 120 is a vertical surface as shown in FIG. 4. This makes it possible to receive the collision object over a wider area. Accordingly, it is possible to suppress a regional deformation of the collision object and to significantly reduce injuries. Furthermore, due to the front end 124b of the front portion 124 being a vertical surface, a greater collision load is input to the cowl side member 120. This makes it possible to promote a deformation of the bending portion 126 and to achieve the above-described effects more reliably.

As shown in FIG. 4, the vehicle body front structure 100 of the present embodiment further includes a connection bracket 130 in addition to the above-described members. The connection bracket 130 connects the front end 124b of the front portion 124 of the cowl side member 120 with the front side member 110 along the vehicle-width direction.

As shown in FIG. 3, the connection bracket 130 includes a vertical surface 130a facing toward the front of the vehicle. In the present embodiment, the area of the vertical surface 130a of the connection bracket 130 is larger than that of the vertical surface (shown by the dashed line) of the front end 124b of the front portion 124. This makes it possible for the collision object to be received over a wider area in the connection bracket 130. Accordingly, a regional deformation of the collision object can be more effectively suppressed.

Furthermore, the cowl side member 120 and the front side member 110 are connected with each other by the connection bracket 130, and thus it is possible to improve a rigidity of the fender apron 104 attached to the cowl side member 120. As a result, it is possible to improve the rigidity of a member attached to the fender apron such as an engine mount (not shown), and to improve the NVH (noise, vibration, harshness) performance.

Furthermore, as shown in FIG. 4, in the present embodiment, the fragile structure 126a is formed on the side face of the bending portion 126 of the cowl side member 120. In this manner, the bending portion 126 is made more fragile than the surrounding portions. In other words, the bending portion 126 itself serves as a fragile part. This makes it possible to promote a deformation of the bending portion 126 and to achieve the above-described effects more reliably.

Note, that although the present embodiment assumes that the fragile structure 126a is an opening (long hole) formed on the side face of the bending portion 126 and extending in the up-down direction, the present invention is not limited to this. Accordingly, any other method can also be used as long as the bending portion 126 is more fragile than the surrounding portions. If the fragile structure 126a is a long hole, it is preferable that the long hole extends so as to tilt upward or downward with respect to the traveling direction. This makes it possible to promote the deformation at the bending portion.

Although a preferred embodiment of the present invention has been described as above with reference to the accompanying drawings, it goes without saying that the present invention is not limited to the embodiment described above. It will be apparent for a person skilled in the art that various modifications and variations may be made within the scope of the invention as defined in the appended claims, and those modifications and variations should be understood to be included within the technical scope of the present invention.

The present invention can be used as a vehicle body front structure.

The invention claimed is:

1. A vehicle body front structure comprising:
a front side member that is located on a side of a power unit mounting room located in a front portion of a vehicle and that extends in a front-rear direction,
a side body constituting a vehicle body side face in the rear of the power unit mounting room;
a cowl side member that is spaced apart from and disposed on the vehicle-width direction outer side of the front side member, and that extends from the side body toward the front of the vehicle, the cowl side member including:
a rear portion that extends from the side body toward the front of the vehicle in parallel with the front side member, and
a front portion that bends at a front end of the rear portion and extends downward toward the front of the vehicle,
wherein an upper face of the front portion is flat, a front end of the front portion is located above the front side member and is tapered toward the front of the vehicle, and the front end of the front portion of the cowl side member is a vertical surface.

2. The vehicle body front structure according to claim 1, further comprising a connection bracket for connecting the front end of the front portion of the cowl side member with the front side member in the vehicle-width direction, and
the connection bracket has a vertical surface that is wider than the above-mentioned vertical surface and that faces toward the front side of the vehicle.

3. A vehicle body front structure comprising:
a front side member that is located on a side of a power unit mounting room located in a front portion of a vehicle and that extends in a front-rear direction,
a side body constituting a vehicle body side face in the rear of the power unit mounting room;
a cowl side member that is spaced apart from and disposed on the vehicle-width direction outer side of the front side member, and that extends from the side body toward the front of the vehicle, the cowl side member including:
a rear portion that extends from the side body toward the front of the vehicle in parallel with the front side member, and
a front portion that bends at a front end of the rear portion and extends downward toward the front of the vehicle,
wherein an upper face of the front portion is flat, a front end of the front portion is located above the front side member and is tapered toward the front of the vehicle, and a fragile structure that is more fragile than the surrounding portions is formed on the side face of the boundary between the rear portion and the front portion of the cowl side member.

4. The vehicle body front structure according to claim 1, wherein a fragile structure that is more fragile than the surrounding portions is formed on the side face of the boundary between the rear portion and the front portion of the cowl side member.

5. The vehicle body front structure according to claim 2, wherein a fragile structure that is more fragile than the surrounding portions is formed on the side face of the boundary between the rear portion and the front portion of the cowl side member.

\* \* \* \* \*